United States Patent [19]
Robinson

[11] Patent Number: 5,662,071
[45] Date of Patent: Sep. 2, 1997

[54] AIR INTAKE ASSEMBLY FOR AN INTERNAL COMBUSTION ENGINE

[76] Inventor: Antonio Robinson, 3850 Hudson Manor Ter., Riverdale, N.Y. 10463

[21] Appl. No.: 724,068

[22] Filed: Sep. 30, 1996

[51] Int. Cl.⁶ .................................................. F02B 75/12
[52] U.S. Cl. ............................................................ 123/1 A
[58] Field of Search ...................... 123/1 A, 3, DIG. 12

[56] References Cited

U.S. PATENT DOCUMENTS

| | | | |
|---|---|---|---|
| 5,117,783 | 6/1992 | Robinson et al. ............... | 123/3 |
| 5,235,936 | 8/1993 | Kracklaver ..................... | 123/1 A |
| 5,282,445 | 2/1994 | Markov ........................... | 123/1 A |
| 5,456,217 | 10/1995 | Thunker et al. ................ | 123/1 A |
| 5,507,942 | 4/1996 | Davis .............................. | 123/1 A |

*Primary Examiner*—Erick R. Solis
*Attorney, Agent, or Firm*—Herbert Dubno

[57] ABSTRACT

A paper envelope containing a power mixture of potassium chlorate and manganese dioxide in a sheath of terry cloth is adhered preferably by a double-backed tape of a wall of the air intake of an air cleaner of an internal combustion engine to activate the air reaching the engine and improve the combustion and reduce fuel consumption.

8 Claims, 1 Drawing Sheet

AIR INTAKE ASSEMBLY FOR AN INTERNAL COMBUSTION ENGINE

FIELD OF THE INVENTION

My present invention relates to an air-intake assembly for an internal-combustion engine, and more particularly, to a system for improving the performance of an internal-combustion engine, especially a motor vehicle, utilizing the principles originally set forth in U.S. Pat. No. 5,117,783 issued 2 Jun. 1992.

BACKGROUND OF THE INVENTION

As has been explained in U.S. Pat. No. 5,117,783, the performance of an internal-combustion engine and especially the internal-combustion engine of a motor vehicle, can be greatly improved by mounting on the air filter of an air cleaner of such an engine, a composition containing potassium chlorate and manganese dioxide which I believe activates the air passing through the air cleaner and thereby contributes positive effects in the combustion of the firing process to improve the performance of the engine.

This composition produces oxygen to increase the oxygen content of the air which reaches the engine, may give rise to hydrogen or otherwise positively modify the mixture of air and moisture reaching the engine, and depends in part for its effect upon the overall activation of the air delivered to the engine.

The presence of moisture in the air reaching the composition enhances the effects described.

In that patent the potassium chlorate and magnesium dioxide composition was provided in a block with a hydraulic cement so that the block has a certain porosity with the cement being used as a binder for the powdered potassium chlorate and magnesium dioxide. The drawback of this earlier system was that the block worked most effectively when additional moisture was delivered to the air utilizing a fitting connected to the intake structure of the air cleaner. Furthermore, the manner in which the block was mounted on the filter required a large number of designs and configurations of the block, depending upon the types of filters which were required for different vehicles.

OBJECTS OF THE INVENTION

It is the principal object of the present invention to provide an improved device for enhancing the performance of an internal combustion engine and reducing the fuel consumption thereof which is more effective than the devices described in the aforementioned patent and other earlier systems, but which nevertheless is more universally useful.

Another object of this invention is to provide an improved air-intake system for an internal combustion engine which can enhance the performance of a motor vehicle without the drawbacks of earlier systems.

SUMMARY OF THE INVENTION

These objects and others which will become apparent hereinafter are attained, in accordance with the present invention by providing a composition of potassium chlorate and magnesium dioxide intimately mixed with one another, not in a block with a cement binder, but in a paper envelope enclosed in a terry cloth sheath, in the air intake of an air cleaner, e.g. by being bonded to an internal wall of the air intake, so that it is no longer necessary to shape the body of the device to suit the filter, but rather the device can be used directly by mounting it in the air intake so that the incoming air flows over and through the terry cloth sheath, the paper envelope and the potassium chlorate/magnesium dioxide powdered mass within this envelope.

More particularly, the air-intake assembly for the internal-combustion engine comprises:

an air cleaner comprising a housing connected to an internal-combustion engine and formed with an air intake projecting from the housing and provided with an air passage;

an air-cleaning filter in the housing; and an activator for air passing through the air intake provided with the air passage, the activator including:
   a paper envelope,
   a mixture of potassium chlorate and manganese dioxide powder in the envelope,
   a terry cloth fabric cover enclosing the envelope, and
   means for affixing the cover to a wall of the air intake defining the passage.

While a preferred mixture consists of 90 parts by weight potassium chlorate and 5 parts by weight manganese dioxide, the potassium chlorate component can make up from 80 to 95 parts by weight of the composition while the magnesium dioxide content can range from one to 10 parts by weight.

Surprisingly, the composition is active even at room temperature or below room temperature to activate the ambient air traversing and passing around the device of the invention and the results obtained are more readily noticeable and are more pronounced when a higher moisture content is present in the air, i.e. the relative humidity of the air is above 40% and preferably above 60% and when the temperature is higher than ambient (as it commonly is in the engine compartment of a vehicle).

While I believe that the improved result is the result of modification of the oxygen content of the atmospheric air caused by the mixture, it is possible that the improved results are in part due to a catalytic activity at the surfaces of the paper envelope and in the terry cloth sheath resulting in the activation by the mixture of the engine air.

In a preferred embodiment of the invention, the device is affixed by double-backed adhesive tape to a wall of the air intake.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
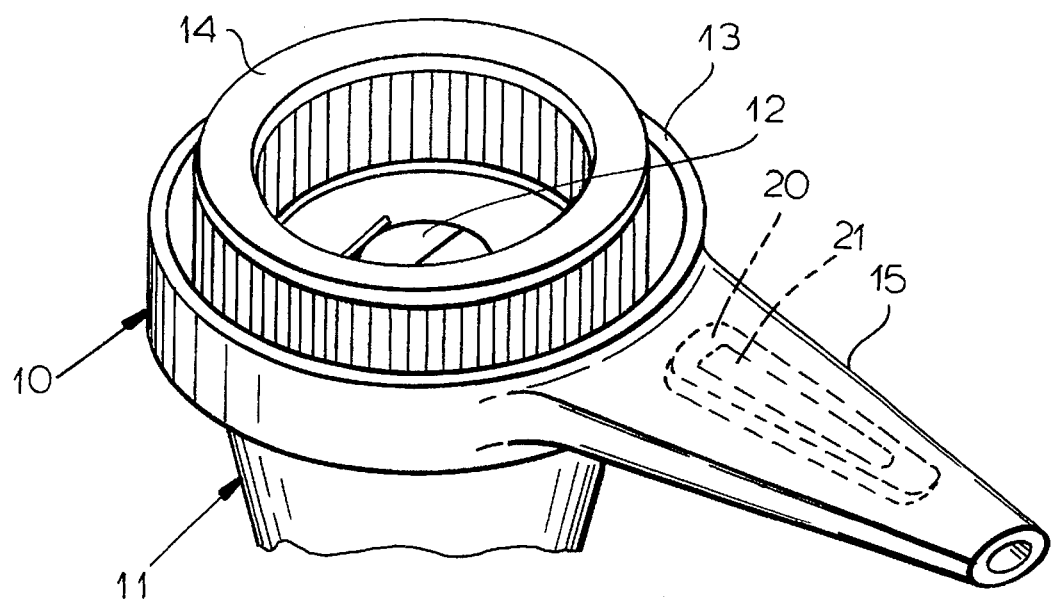
FIG. 1 is a perspective view showing an air filter provided with the device of the invention.

In FIG. 1 of the drawing, I have shown an air cleaner 10 mounted above an air passage 11 of an internal-combustion engine, the air intake of which is seen at 12 and is equipped with a housing 13 receiving the replaceable air filter 14 as in the prior U.S. Pat. No. 5,117,783. The cover to this housing 13 has not been shown in the drawing. In the patent mentioned, the device containing the potassium chlorate and manganese dioxide was provided directly on the air filter 14 itself. As a consequence, the device required a special configuration for each type of air filter which was commercially available and the device for one air filter could not be readily applied to another.

With the present invention, I have provided a device of practically universal applicability for air cleaners of all types such that one device configuration can be used for almost all air cleaners. As can be seen from FIG. 1, the device represented at 20 can be secured by a double-backed tape 21 to the upper wall of an air intake 15 of the housing 13. The upper wall is shown at More particularly, as can be seen from FIGS. 2–4, the activating device can comprise an envelope, e.g. composed of paper and represented at 22, containing an ultimate particle mixture 23 which can have any of the compositions previously mentioned but preferably contains 90 parts by weight of potassium chlorate to 5 parts by weight of manganese dioxide. The powder mixture does not require the cement of the prior patent and represents a loose filling in the paper envelope 22. The paper envelope 22 is, in turn, surrounded by a porous fabric, preferably a terry cloth and represented at 24 in the drawing.

The terry cloth fabric is important, in that it assists in activating the air, especially in the presence of moisture and thus enables the powder mixture within the envelope to be effective so that as air passes through the intake 15 to the air filter, the air is activated by what may be the modification of the oxygen content of the air and/or the conversion of water vapor to oxygen or the injection of atoms or molecules of oxygen into the moisture normally present in the air so that without special moisturization, the engine combustion is improved and the fuel utilization increased. Indeed the fuel burns more efficiently and the exhaust gas is cleaner and contains less carbon monoxide. The economics of automobile use generally, is therefore also improved. An important contribution of the invention is the reduction in our pollution which results.

Figure 3:
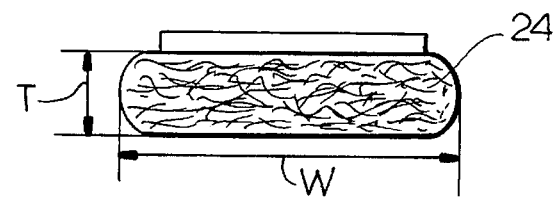
FIG. 3 is an end view of the device of FIG. 2.
Figure 2:
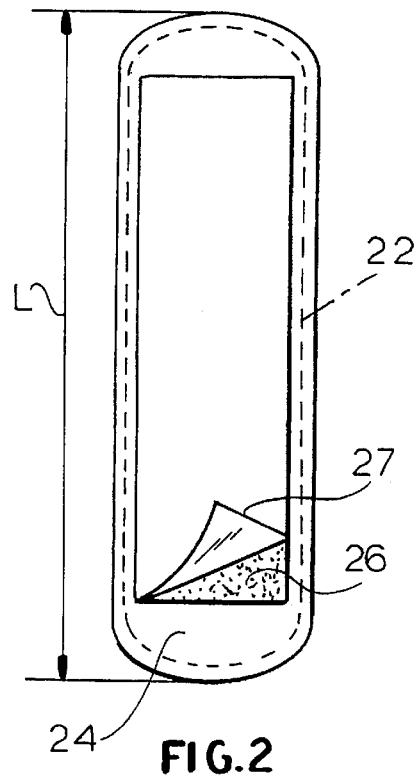
FIG. 2 is an elevational view showing a masking layer of the double-backed adhesive tape, partly removed for application to the device to a wall of an air intake.
Figure 4:
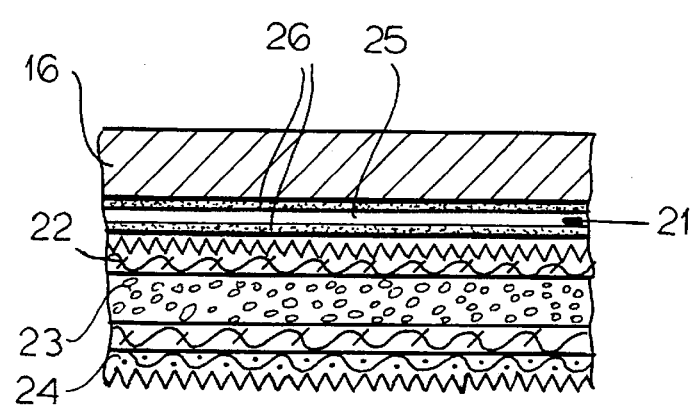
FIG. 4 is a cross sectional view through a portion of the intake of an air cleaner showing the device of the invention mounted on the underside of a wall thereof.

The length L of the device shown in FIGS. 2 and 3 can range between say two inches and ten inches while the width W of the device can range between one and four inches. The thickness T should be selected such that it does not materially obstruct the intake 15 and can range from say one-half inch to one inch.

While the preferred mode of attaching the device to the wall 16 of the air intake is a double-backed tape as has been illustrated at 21, i.e. a tape with a paper support 25 and pressure or contact adhesives 26 on opposite sides thereof, other attachment techniques are suitable as well. Before the device is applied, a masking sheet 27 is removed (FIG. 2) to expose the upper layer of adhesive 26 and allow that layer to be pressed against the wall 16.

The device can be installed upon manufacture of the vehicle or retrofitted thereto and can be used for diesel as well as gasoline engines.

I claim:

1. An air-intake assembly for an internal combustion engine comprising:

an air cleaner comprising a housing operatively connected to said internal combustion engine and formed with an air intake provided with an air passage projecting from said housing;

an air-cleaning filter in said housing; and an activator for air passing through said air intake, said activator including:
a paper envelope,
a mixture of potassium chlorate and manganese dioxide powder in said envelope,
a fabric cover enclosing said envelope, and
means for affixing said cover to a wall of said air intake defining said passage.

2. The air-intake assembly defined in claim 1 wherein said mixture contains substantially 90 parts by weight potassium chlorate and 5 parts by weight manganese dioxide.

3. The air-intake assembly defined in claim 2 wherein said cover is composed of a terry cloth.

4. The air-intake assembly defined in claim 3 wherein said means for affixing is a double-backed adhesive tape bondable to said wall and to said cover.

5. A device adapted to be affixed in an air intake of an air cleaner for an automotive vehicle internal combustion engine for increasing power and reducing fuel consumption of said engine, said device comprising:

a paper envelope, a mixture of potassium chlorate and manganese dioxide powder in said envelope, a fabric cover enclosing said envelope, and means for affixing said cover to a wall of said air intake defining said passage.

6. The device defined in claim 5 wherein said mixture contains substantially 95 parts by weight potassium chlorate and 5 parts by weight manganese dioxide.

7. The device defined in claim 6 wherein said cover is composed of a terry cloth.

8. The device defined in claim 7 wherein said means for affixing is a double-backed adhesive tape bondable to said wall and to said cover.

* * * * *